No. 647,376. Patented Apr. 10, 1900.
J. M. COHEN.
ADJUSTABLE CUTTING STICK.
(Application filed Mar. 7, 1899.)
(No Model.)

WITNESSES:

INVENTOR
Joseph M. Cohen.
BY
ATTORNEYS.

THE NORRIS PETERS CO., PHOTO-LITHO., WASHINGTON, D. C.

UNITED STATES PATENT OFFICE.

JOSEPH M. COHEN, OF NEW YORK, N. Y.

ADJUSTABLE CUTTING-STICK.

SPECIFICATION forming part of Letters Patent No. 647,376, dated April 10, 1900.

Application filed March 7, 1899. Serial No. 708,126. (No model.)

*To all whom it may concern:*

Be it known that I, JOSEPH M. COHEN, of the city of New York, borough of Manhattan, in the county of New York and State of New York, have invented a new and Improved Cutting-Stick, of which the following is a full, clear, and exact description.

This invention relates to improvements in cutting-sticks used by operators in cutting stock for the manufacture of neckties or similar goods in which the edges are parallel. The stock, particularly for neckwear, is cut in different widths, and at present it is necessary to have a cutting-stick for each width.

The object of my invention is to provide a stick that may be quickly and readily adjusted to any desired width, thus making one stick answer the purpose for which several sticks are usually employed.

I will describe a cutting-stick embodying my invention and then point out the novel features in the appended claim.

Reference is to be had to the accompanying drawings, forming a part of this specification, in which similar characters of reference indicate corresponding parts in all the figures.

Figure 1:
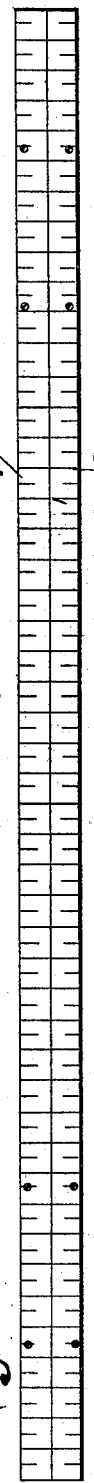
Figure 2:
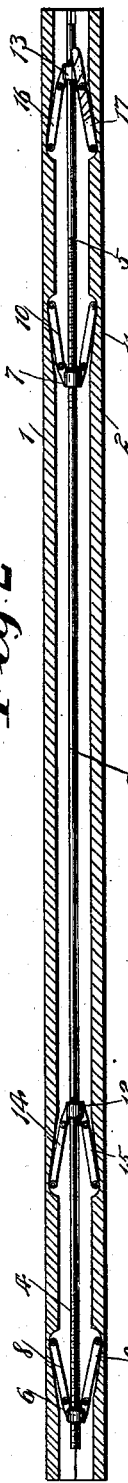
Figure 3:
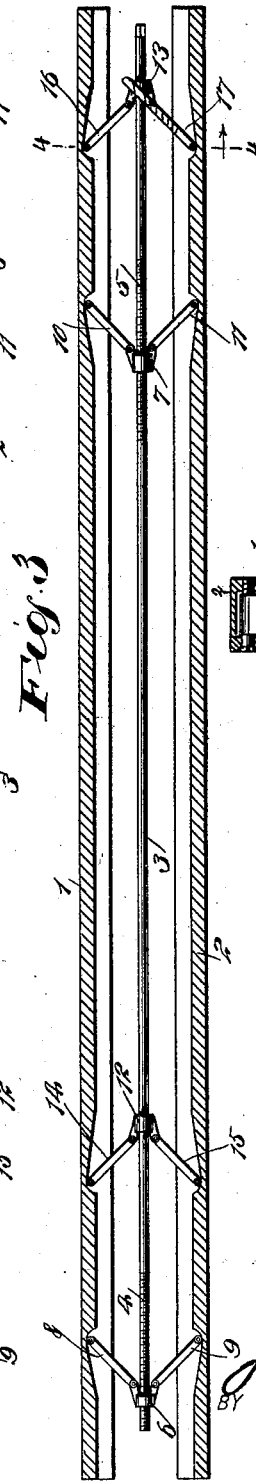
Figure 4:
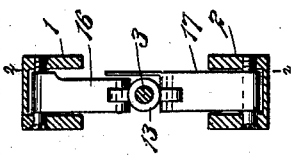

Figure 1 is a plan view of a cutting-stick embodying my invention. Fig. 2 is a longitudinal section on the line 2 2 of Fig. 4. Fig. 3 is a longitudinal section showing the members of the stick as spread apart, and Fig. 4 is a section on the line 4 4 of Fig. 3.

The cutting-stick comprises two parallel members 1 2, each being provided on its upper side with a scale indicating inches or other measurements, and for convenience the divisions of the two scales will be numbered from opposite ends. The members 1 and 2 are made trough-shaped, with the openings inward.

Extended longitudinally through the stick is an adjusting-rod 3, which at one end is made angular to receive a key or other instrument for turning the rod. Engaging the screw-threaded portions 4 and 5 of the rod are interiorly-threaded collars 6 7. From the collar 6 links 8 and 9 extend to pivotal connection, respectively, with the sections 1 2, and from the collar 7 similar links 10 11 extend to pivotal connection with said sections 1 2.

Collars 12 13 are loosely mounted on the rod 3, so that said rod may turn therein. The rod is prevented from longitudinal movement through the collars by any suitable means. I have here shown pins as extended through the rod at the opposite ends of the collars. From the collar 12 a link 14 extends to a pivotal connection with the section 1 of the stick, and a link 15 extends from said collar to a pivotal connection with the section 2, and from the collar 13 a link 16 extends to a pivotal connection with the section 1, and a link 17 extends from said collar to the section 2.

It will be seen that the links 8 and 9 are extended in an opposite direction to that of the links 14 and 15 and that the links 10 and 11 are extended in an opposite direction to that of the links 16 and 17. Therefore it is obvious that upon rotating the rod 3 the two sections 1 and 2 of the stick may be adjusted toward or from each other and at all times have their outer edges in parallelism.

To readily set two sections of the stick to the proper width, I employ a width-indicating device in connection with the stick. As here shown, this width-indicating device consists of graduations marked on one of the links, the graduations being spaced for inches and fractions thereof. The link upon which the graduations are marked has its inner end extended over the top of the collar to which it is connected. The object in so extending the link is to make the graduations visible when the two sections of the stick are but slightly separated. As the links and screw-rod are wholly within the trough-like sections, there are no projections on the outer side of the stick that would prevent its use either side down.

In operation the stick is to be adjusted to the desired width and then placed upon the layers of goods to be cut, and then the goods are cut by means of a knife moved along the edges of the stick. The graduations on the link are so arranged that the mark seen nearest the inner edge of the stick member will indicate the width between the outer parallel edges of the stick.

Having thus fully described my invention, I claim as new and desire to secure by Letters Patent—

A cutting-stick for use in cutting stock or neckties and the like, comprising two trough-like sections with the openings inward, the outer edges of the two sections being parallel one with the other and of uniform thickness, an adjusting-rod extending longitudinally through the sections, collars having screw-thread engagement with the rod, link connections between said collars and the stick-sections, other collars loosely mounted on the rod, link connections between said other collars and the sections, one of said links having its inner end extending over its collar, and a width-indicating scale on said extended link, substantially as specified.

JOSEPH M. COHEN.

Witnesses:
C. R. FERGUSON,
F. W. HANAFORD.